Patented June 15, 1954

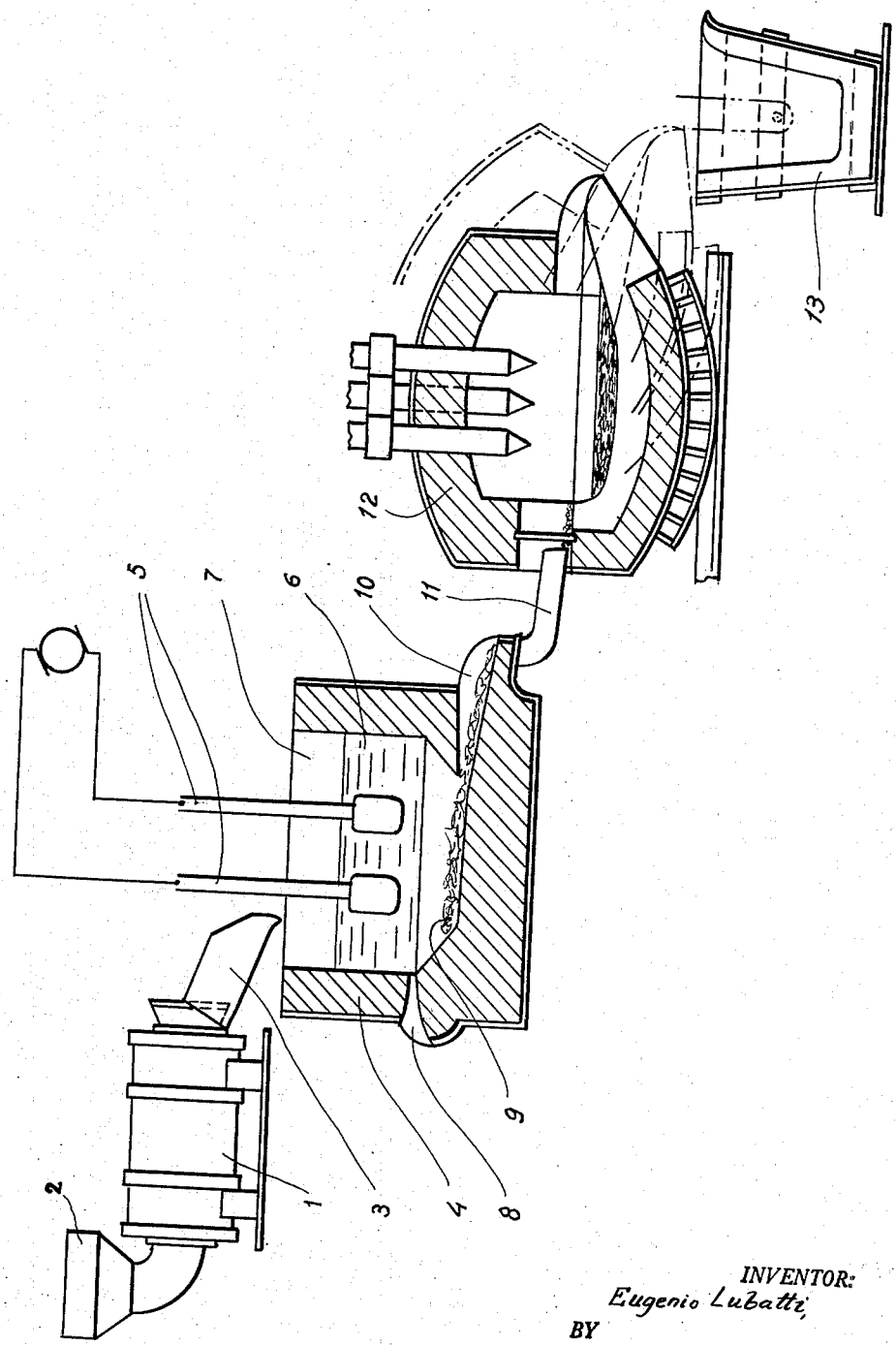

2,681,275

UNITED STATES PATENT OFFICE 2,681,275

PROCESS FOR PRODUCING STEEL FROM FERREOUS ORES DIRECTLY

Eugenio Lubatti, Turin, Italy

Application June 1, 1951, Serial No. 229,303

Claims priority, application Italy June 5, 1950

3 Claims. (Cl. 75—11)

The present invention relates to a process for direct production of steel by employing ores as starting material, in one working cycle and without stopping the process at the production of pig iron.

The advantage of the process according to the invention consists in reducing the consumption of coal, in the possibility of utilizing carbonaceous ores and materials in small and minute pieces (including powder form), of lower quality, and in the possibility of obtaining in the liquid state, with a comparatively simple installation, a metallic alloy of a composition only little different from that of the final product, which is obtained through a phase (refining phase) carried out in known steel furnaces, but rendered more simple and rapid by the nature of the product treated in said furnaces.

The steel obtained is very pure owing to the possibility of eliminating in particular phosphorus and sulphur.

The process according to the invention is substantially based on the following phases:

(a) A process-starting slag, similar to slag from blast furnaces, is prepared, either directly in the furnace or in a separate container, for example by melting a mixture of lime, silica and alumina conveniently dosed;

(b) Iron ores (or industrial residues containing iron), reducing agents (in particular coal), slag builders (for example lime) in addition, if required, of other minerals for instance manganese, are, if necessary, broken up to powder or small pieces;

(c) The powdered materials under (b) are intimately mingled together, with suitable means;

(d) The said materials are poured from above upon a bed of molten slags prepared in a furnace (see phase a) and maintained at a high temperature, so as to build a layer of nearly uniform thickness. Care should be taken that the charge completely covers the surface of the molten bath, in particular that it comes in contact with the walls and is not excessively crammed together in order not to obstruct the passage of the gases; nor should the charge on the other hand be so loose as to build escape passages for the gases to escape without having reacted;

(e) The slag is heated to and maintained at a high temperature by the passage of electric current. The heat of the slag is transferred to the overlying charge whose components react, the minerals are reduced, the limestone is transformed into calcium oxide and dissolves the gangue; the result is droplets of metal and droplets of slag which arrive by gravity at the molten bath, the former separating out by difference of specific weight and settling to the bottom, the latter diffusing and incorporating with the bath;

(f) The metal gradually forming is drawn from the bottom of the furnace either continuously or intermittently as it is formed;

(g) Slag is drawn in a continuous or intermittent manner through an opening made in the furnace wall, so as to maintain approximately constant the thickness of the slag layer in the interior of the furnace.

(h) The feeding of the furnace from above is continued, as explained under (d). The thickness of the charge in normal operation may be for example 50 cms. if the basin of the furnace has a diameter of 4 meters;

(i) The metal drawn from the furnace, as indicated under (f), may be left to solidify and then charged in a steel furnace. However, it is preferable, for obtaining a larger production and saving heat, to introduce the molten metal, drawn from the reduction furnace, directly into a steel furnace (for example of the Heroult, Martin-Siemens, etc. type), where the refining process is carried out, which, although being conducted on the same general lines holding good for the production of steel from cast iron, ore, and scraps, proves to be very rapid on account of the material charged into the furnace having a composition very near to the final one;

(l) If it is desired to obtain special steels, the required correctives will be added while the material is in the refining furnace.

By way of example, the annexed drawing diagrammatically shows means, which are essential to the performance of the process according to the invention.

A mixer 1 receives the materials from a hopper 2 and discharges them through a channel or funnel 3 which leads to a reduction furnace 4 where the electrodes 5 heat a bath 6 on the surface of which a layer of charge 7 is disposed.

The slag can be drawn off through the spout 8, while the metal depositing at 9 is drawn through the opening 10 and taken along the channel 11 to the steel furnace 12 which, when caused to tilt at the right time (as shown in dot and dash lines), pours the metal into the ladle 13.

One example of application of the process:

(1) To put the furnace in operation, a mixture is melted which comprises 44% calcium oxide, 37% silica, 12% alumina (the remainder comprises various impurities).

A slag is obtained of approximately the following composition:

43.7% CaO, 2.98% MgO, 36.5% SiO$_2$, 11.5% Al$_2$O$_3$ (2) As homogeneous a mixture as possible, composed of the following products, is charged (the charge refers to the quantities required to obtain a ton of raw steel for refining):

(I) 1700 kgs. iron ore with the following percent composition (referred to the weight of the dry product); 59.5% Fe—10% SiO$_2$—3% Al$_2$O$_3$—0.7% Mn, S+P+ other impurities 1%.

(II) 300 kgs. coke in pieces of size from 0 to 10 mms. (fine powder), having the following composition referred to as dry product: 80% fixed carbon, 8% silica, 3% Al$_2$O$_3$, 2% MgO, 6% volatile substances, S+P 1%.

(III) 460 kgs. limestone having the composition:

51% CaO—40% CO$_2$—1.5% Al$_2$O$_3$, 3% SiO$_2$—2.5% MgO (3) From the furnace, a gas flows out containing 540 kgs. carbon dioxide (of which 400 originated from the reduction and 140 from decomposition of the limestone), and 270 kgs. of carbon oxide; it further contains various impurities and small quantities of water vapour.

The temperature of the gases at the outlet is of only a few tens of degrees above room temperature.

(4) From the reduction furnace a ton of raw steel is obtained which has the following composition: 97.2% iron, 1.5% carbon, 0.7% manganese, 0.5% silicium, sulphur+phosphorus less than 0.1% in total.

The metal leaves the furnace at a temperature of about 1400° C. and the slag at about 1550° C.

In the case of the metal being ladled to the refining furnace, it should be drawn off at a somewhat higher temperature to compensate for cooling during transit.

(5) The slag which is discharged has the following approximate composition: 43.7% CaO—2.28% MgO—36.5% SiO$_2$—11.50% Al$_2$O$_3$—2.62% FeO—1.75% MnO—0.87 sulphur.

The iron oxide content of the slag is remarkably low, which indicates a good utilization of the iron content of the starting material.

For every ton of steel, about 570 kgs. of slag are produced.

(6) Refining in a furnace of the Heroult or the reverberatory type, by the addition of selected scrap or ore, will require but a very short time due to the remarkable purity of the molten bath and the comparatively low carbon content.

This phase of the process, which is carried out in steel furnaces, is achieved after the known technique, taking into account the different features of the starting material as heretofore explained.

From the above are easily derived the advantages of the new process, namely: economical operation, possibility of employing ore in powder form, possibly obtained through a concentration process, hence poor in gangue, and in the possibility of utilizing as a reduction material an inexpensive carbonaceous substance. Furthermore, as the product obtained has the lowest sulphur and phosphorus content, it allows of a rapid transformation into the steel which is desired to obtain.

What I claim is:

1. In a process for the manufacture of steel from iron ores, the steps comprising, creating in an electrode furnace, from a mixture of calcium oxide, silica and alumina, a calcium aluminum silicate slag, maintaining the same in said furnace in the molten state, charging into the said slag layer a homogeneous pulverulent mixture of iron ore, coke and limestone and producing thereby superposed layers of molten slag and of molten steel, discharging said molten slag layer at a temperature of about 1550° C. and said molten steel at a temperature of about 1400° C. from opposite sides of said electrode furnace, conducting the discharged molten steel into a reverberatory refining furnace while controlling the discharge of the slag to maintain the same at an equal height.

2. In a process according to claim 1, the step of controlling said pulverulent mixture to consist of 69 parts by weight of iron ore, 12 parts by weight of coke and 19 parts by weight of limestone.

3. A process according to claim 2, the steps comprising adding to the molten steel held in the refining furnace components to produce special steels.

References Cited in the file of this patent

UNITED STATES PATENTS

| Number | Name | Date |
|---|---|---|
| 874,391 | Chute | Dec. 24, 1907 |
| 995,481 | Price | June 20, 1911 |
| 2,523,092 | Bryk et al. | Sept. 19, 1950 |

OTHER REFERENCES

Electric Furnace for Iron and Steel, pages 74 to 76, edited by Stansfield, published in 1923 by the McGraw-Hill Book Co., New York.